US006799563B1

(12) United States Patent
Warren

(10) Patent No.: US 6,799,563 B1
(45) Date of Patent: Oct. 5, 2004

(54) TWO STROKE INTERNAL COMBUSTION ENGINE

(76) Inventor: Edward Lawrence Warren, 3912 Snowy Egret Dr., West Melbourne, FL (US) 32904

(*) Notice: Subject to any disclaimer, the term of this patent is extended or adjusted under 35 U.S.C. 154(b) by 0 days.

(21) Appl. No.: 10/700,421

(22) Filed: Nov. 5, 2003

(51) Int. Cl.[7] .................................................. F02C 5/00
(52) U.S. Cl. ....................................................... 123/543
(58) Field of Search ................................ 123/543, 552, 123/546, 550; 60/517

(56) References Cited

U.S. PATENT DOCUMENTS 4,077,221 A 3/1978 Maeda
4,280,468 A * 7/1981 Millman ..................... 123/546
4,631,922 A 12/1986 Kleinwachter et al.
4,790,284 A * 12/1988 Ferrenberg et al. ......... 123/543
5,537,820 A 7/1996 Beale et al.
5,540,191 A * 7/1996 Clarke ...................... 123/25 C
5,632,255 A * 5/1997 Ferrenberg .................. 123/543
6,116,222 A 9/2000 Warren
6,199,520 B1 * 3/2001 Warren ..................... 123/48 R
6,253,746 B1 * 7/2001 Warren ........................ 123/543
6,286,468 B1 * 9/2001 Warren .................. 123/48 AA

* cited by examiner

*Primary Examiner*—Marguerite McMahon

(57) ABSTRACT

The "Two Stroke Internal Combustion Engine" is a piston engine operated with compression cooled by cooler 17. This is followed by heat addition from heat exchanger high-pressure side 10 at close to constant pressure (the pressure at the end of the heat addition is the same as the pressure at the start of the heat addition). Heat is then added at close to constant volume by burning fuel. This is followed by complete expansion. And finally, heat exchanger low-pressure side 40 transfers heat to heat exchanger high-pressure side 10.

6 Claims, 4 Drawing Sheets

TWO STROKE INTERNAL COMBUSTION ENGINE

BACKGROUND—FIELD OF INVENTION

The present invention relates to a reciprocating, two-stroke internal combustion engine that can return most of the exhaust heat to the engine cycle to do work. Thermal regeneration is the capturing of waste heat from a thermodynamic cycle (or a heat engine operating on some thermodynamic cycle), and the utilization of that energy within the cycle or engine to improve the cycle or engine's performance. This is commonly done with many heat engines including Stirling engines, gas turbines, and Rankine cycle devices. In a gas turbine the exhaust heat coming out of the exhaust is transferred to the air leaving the compressor and going into the combustor. This way it is not necessary to add as much heat (fuel) in the combustor to raise the air temperature to the desired turbine intake temperature. This means that the same work is accomplished but less fuel is used. The automobile and truck gas turbines use rotating regenerators to transfer energy from the exhaust gases to-the-compressed air.

BACKGROUND—DESCRIPTION OF PRIOR ART

The approach taken by previous inventors who attempted to incorporate regeneration into reciprocating internal combustion engines was to try to regenerate using a movable heat exchanger low-pressure side attached to the movable wall. The most successful design is Two Stroke Regenerative Engine, Warren (2000, U.S. Pat. No. 6,116,222). The drawback to this design is moving the mass of the regenerator, and difficulty cooling the power piston. Other differences exist between that engine and the-regenerated engine disclosed herein. All of these are discussed in greater detail in the section entitled "Description".

SUMMARY

The "Two Stroke Internal Combustion Engine" is an engine that operates on a very efficient cycle. To obtain this good efficiency the "Two Stroke Internal Combustion Engine" is an engine where very little heat is rejected from the engine because compression is carried out at close to constant temperature. This is accomplished by multistage intercooling. After compression, heat that is obtained from the heat exchanger at near constant pressure is added to the compressed air. Before the pressure starts to drop, heat is added at high temperature by injecting fuel and burning it in a slowly expanding volume, complete expansion then takes place. And finally, heat is transferred by the heat exchanger from the exhaust to the air coming from the compressor exit, then the cycle repeats.

The engine of this invention can be operated on a cycle that approaches the maximum efficiency possible. The compression is cooled. With enough additional compressors the compression process approaches constant temperature compression. This process rejects the least amount of heat possible. There is no known way to reject less heat. The heat that is recovered from the exhaust by the heat exchanger is then added at close to constant pressure. Then before the pressure drops, heat is added at high temperature by injecting fuel and burning it in a slowly expanding volume. This process adds close to the most amount of heat possible. Complete expansion takes place.

The engine is a two-stroke, internal combustion, reciprocating engine made up of a number of similar working units.

Each working unit is comprised of cylinder 12 that is closed at one end by cylinder head 4 and contains power piston 18 that is connected to power output shaft 22. Movable wall 11 is provided to take in the working air, to move the working air through heat exchanger high-pressure side 10, to move the working air through heat exchanger low-pressure side 40, and to push the exhaust out of cylinder 12. Displacer 9 is provided to move the working air through cooler 17. Movable wall 11 and displacer 9 can move between power piston 18 and cylinder head 4. The means to accomplish this movement at the appropriate times during the engine's operating cycle are: cam 30 moving moveable wall cam follower 32 that is attached to movable wall 11 and cam 30 moving displacer cam follower 33 that is attached to displacer 9.

Objects and Advantages

The advantages of the Warren Cycle Internal Combustion Engine are:

- It can be operated with little heat rejected and what is rejected is rejected at the lowest temperature possible for a hot air heat engine.
- It can be operated with a large amount of heat added at a very high temperature.
- The thickness of movable wall 11 can be such that the compression and the expansion volumes are separated. The heat from one does not effect the other.
- All parts of the engine that are hot stay hot. All parts of the engine that are cold stay cold. There is no cycling of any parts of the engine between hot and cold.
- The air compressed into cooler 17 stays compressed in cooler 17 and waits for the next cycle.
- The compressed air in heat exchanger high-pressure side 10 stays compressed in heat exchanger high-pressure side 10 and waits for the next cycle.
- As many compressor cooling systems as desired may be added to the engine. The more compressor cooling systems an engine has, the closer its compression equals the efficient constant temperature compression.

DRAWING FIGURES

REFERENCE NUMERALS IN DRAWINGS

Figure 1:
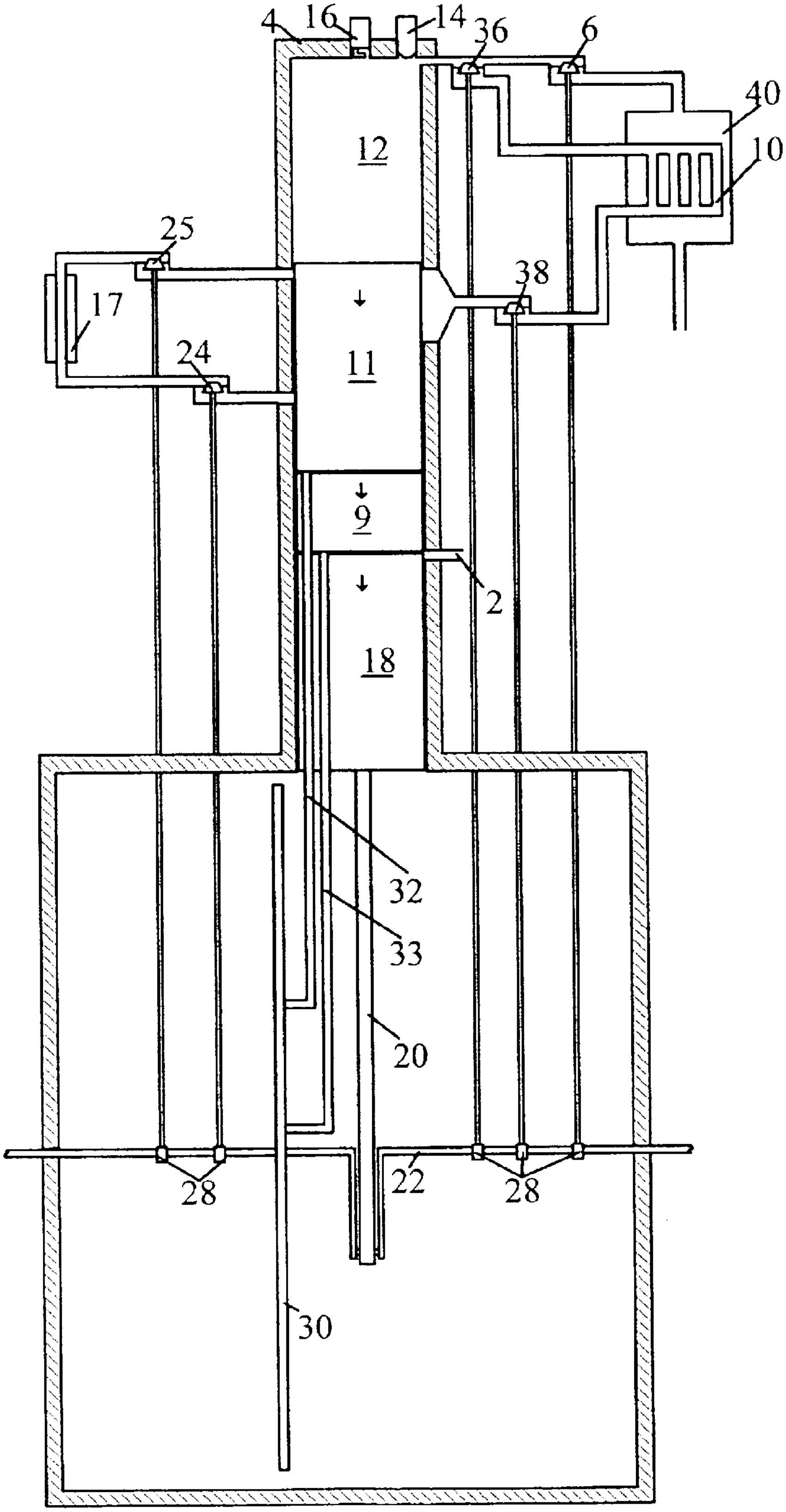
FIG. 1 shows the preferred embodiment of the engine at the end of the heated expansion part of the cycle, and at the start of the air intake part of the cycle.

2 air intake port
4 cylinder head
6 exhaust valve
9 displacer
10 heat exchanger high-pressure side
11 movable wall
12 cylinder
14 fuel injector
16 igniter
17 cooler

18 power piston
20 connecting rod
22 power output shaft
24 lower compressor valve
25 upper compressor valve
28 valve cams
30 cam
32 moveable wall cam follower
33 displacer cam follower
36 upper port valve
38 heater port valve
40 heat exchanger low-pressure side Description—FIGS. 1 to 4—Preferred Embodiment The preferred embodiment of this invention is a two-stroke, reciprocating, internal combustion engine with heat exchanger high-pressure side 10, heat exchanger low-pressure side 40, displacer 9, and employing a movable wall 11. The invention employs a two-stroke cycle, divided into four parts. The first part is the air intake part, the second is the cooled compression part, the third is the heat recovery part, and the fourth is the heated expansion part. The air intake part is from about 85% of the downward travel of power piston 18 to about 15% of the travel back up (or as measured by power output shaft 22 rotation from about 135° to about 225°). The cooled compression part is from about 15% of the travel back up of power piston 18 (225°) to about 100% of the travel back up of power piston 18 (360°). The heat recovery part is from about top dead center of power piston 18 (360°) to about 15% of the downward travel of power piston 18 (45°). The heated expansion part is from about 15% of the downward travel of power piston 18 (45°) to about 85% of the downward travel of power piston 18 (135°).

The above positions are all estimates and are given for descriptive purposes only. The actual position a part of the cycle may begin or end at may be different from those set out above.

Cylinder 12 is closed at one end by cylinder head 4. Air intake port 2 allows air into cylinder 12. Inside or attached to cylinder 12 are, displacer 9, movable wall 11, fuel injector 14, igniter 16, cooler 17, power piston 18, and connecting rod 20. Connecting rod 20 is connected to power output shaft 22, which operates cam 30 and valve cams 28. Displacer 9 is moved by cam 30 through displacer cam follower 33. Movable wall 11 is moved by cam 30 through moveable wall cam follower 32. Lower compression valve 24 and upper compressor valve 25 control the flow of air through cooler 17. Heat exchanger high-pressure side 10 is attached to cylinder 12 between upper port valve 36 and heater port valve 38. Air intake port 2 allows fresh air into cylinder 12. Exhaust valve 6 allows exhaust into heat exchanger low-pressure side 40.

The compressor cooling system is made up of displacer 9, displacer cam follower 33, a grove in cam 30, cooler 17,lower compressor valve 24, and upper compressor valve 25. Cooler 17 cools the air as it is being compressed. Lower compressor valve 24 and upper compressor valve 25 control the air flow through cooler 17. The engine will operate without any compressor cooling systems. As many compressor cooling systems as desired may be added to the engine. The more compressor cooling systems an engine has, the closer its compression equals constant temperature compression.

The thickness of movable wall 11 can be such that the compression and the expansion volumes are separated. The heat from one does not effect the other.

The engine is shown with power output shaft 22 transferring power out of the engine. Other means such as a wobble plate could be used to transfer power from the engine.

The engine is shown with cam 30 moving displacer 9 and movable wall 11. Other means such as an actuator could move displacer 9 and movable wall 11.

The engine is shown with poppet type valves. Other type valves could be used.

Operation—FIGS. 1 to 4—Preferred Embodiment

FIGS. 1 to 4 present the sequence of steps or processes occurring in the engine. The air intake part of the cycle takes place between FIGS. 1 and 2. The cooled compression part of the cycle takes place between FIGS. 2 and 3. The heat recovery part of the cycle takes place between FIGS. 3 and 4. The heated expansion part of the cycle takes place between FIGS. 4 and 1.

FIG. 1 shows power piston 18 at about 85% of downward travel (135°). The engine has completed the heated expansion part of the cycle. Air intake port 2 is covered, exhaust valve 6 is closed, lower compressor valve 24 is closed, upper compressor valve 25 is closed, upper port valve 36 is closed, heater port valve 38 is closed, and displacer 9 and movable wall 11 are just above power piston 18.

Figure 2:
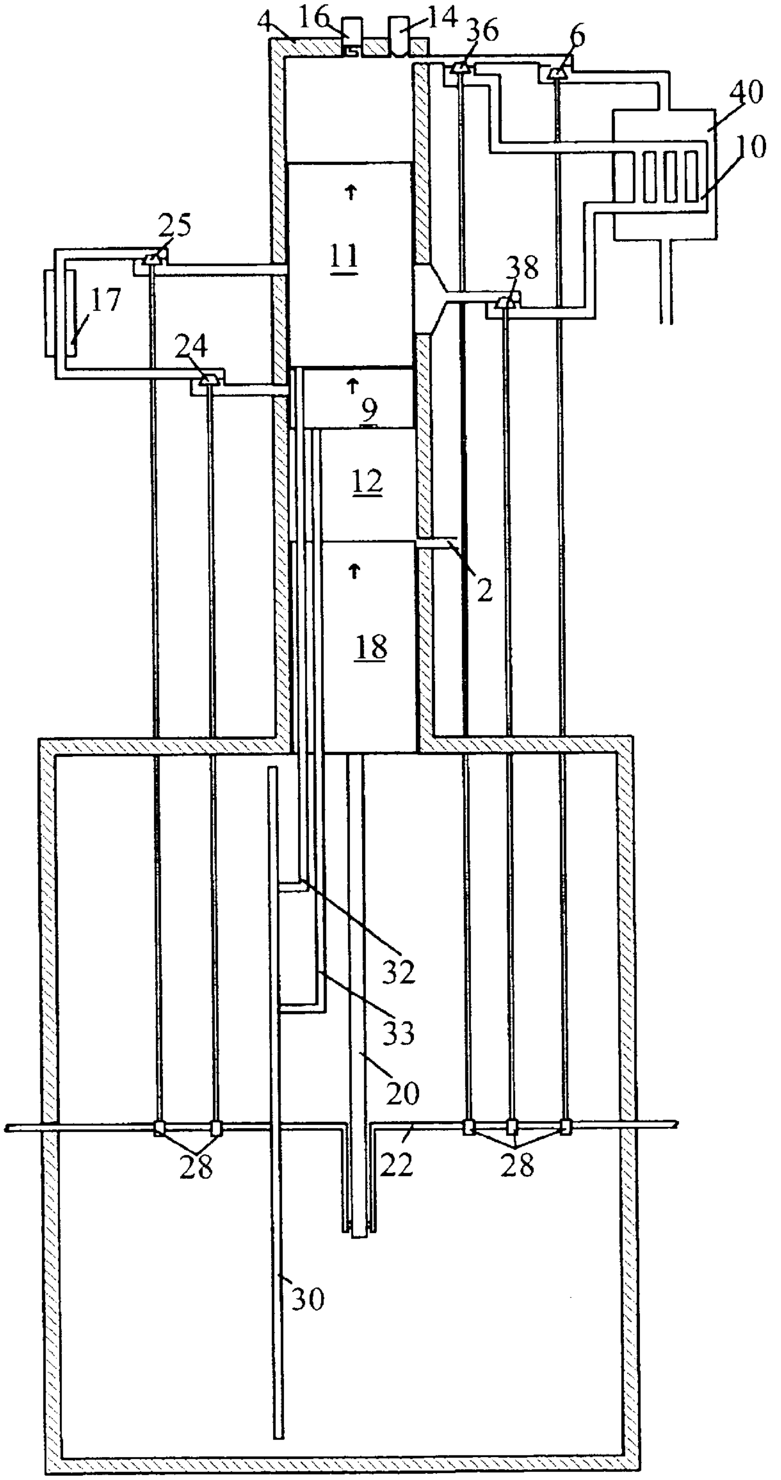
FIG. 2 shows the preferred embodiment of the engine at the end of the air intake part of the cycle, and at the start of the cooled compression part of the cycle.

Between FIG. 1 and FIG. 2 the air intake part of the cycle takes place. Exhaust valve 6 opens, air intake port 2 is uncovered, and cam 30 moves displacer 9 and movable wall 11 up toward cylinder head 4. While movable wall 11 is moving up it moves the air through heat exchanger low-pressure side 40 and out of cylinder 12. In addition it sucks air into cylinder 12 through air intake port 2. Power piston 18 continues down to the bottom of cylinder 12 and comes up again to about 15% of upward travel of power piston 18 (225°). As the air moves through heat exchanger low-pressure side 40 the air gives up heat to heat exchanger high-pressure side 10. The heat is later added back into the cycle.

FIG. 2 shows power piston 18 at about 15% of upward travel (225°). The engine has completed the air intake part of the cycle. Air intake port 2 is covered. Exhaust valve 6 is open. Lower compressor valve 24 is closed. Upper compressor valve 25 is closed. Upper port valve 36 is closed. Heater port valve 38 is closed. And displacer 9 and movable wall 11 are moving toward the top of cylinder 12.

Figure 3:
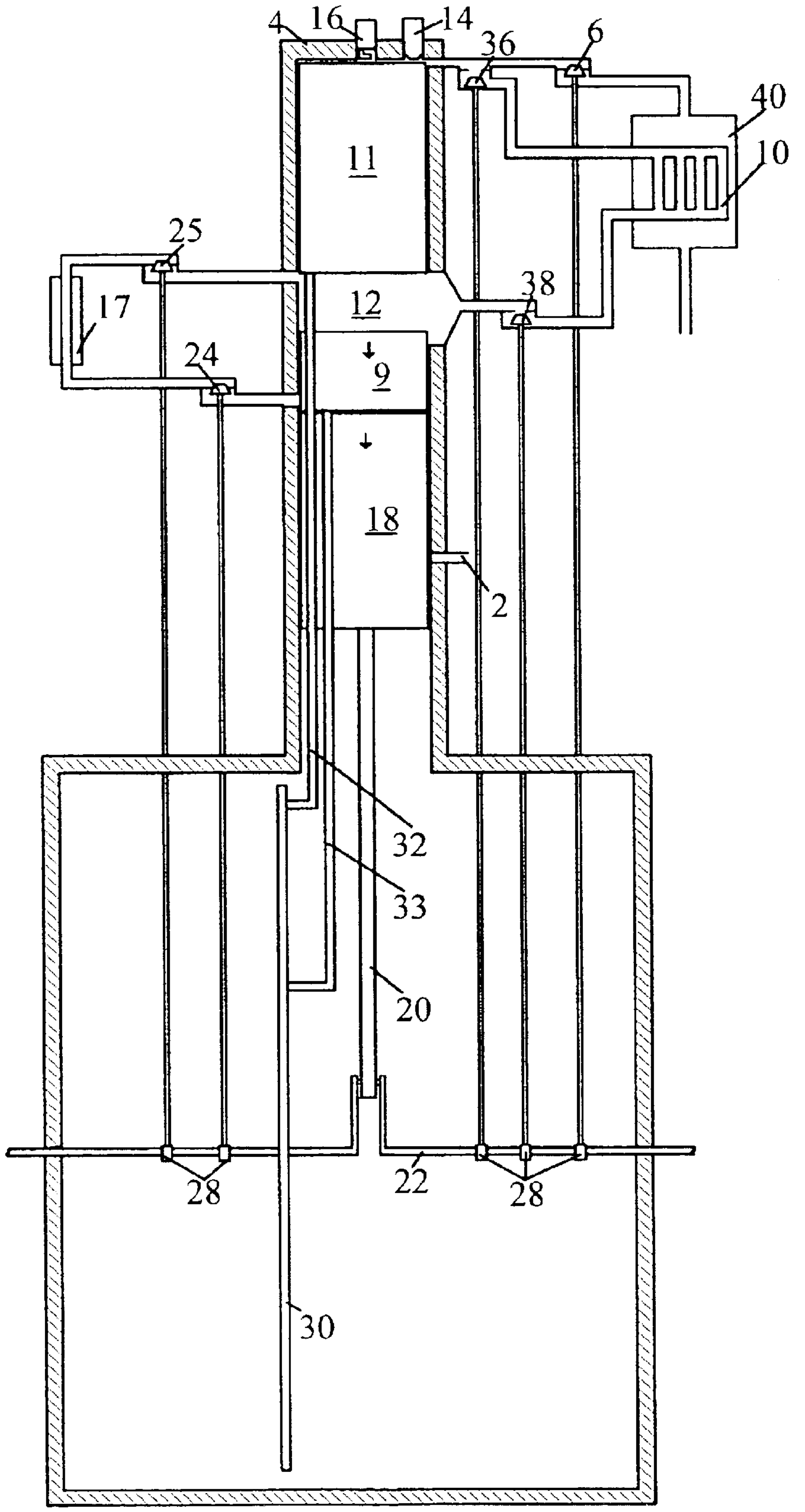
FIG. 3 shows the preferred embodiment of the engine at the end of the cooled compression part of the cycle, and at the start of the heat recovery part of the cycle.

Between FIG. 2 and FIG. 3 the cooled compression part of the cycle takes place. Lower compressor valve 24 and upper compressor valve 25 open. Movable wall 11 moves to the top of cylinder 12. When movable wall 11 reaches the top of cylinder 12 exhaust valve 6 closes. Power piston 18 and displacer 9 continue up at different rates of travel. They come together at about 100% of upward travel of power piston 18 (360°). As they are coming together, air is forced from between them through cooler 17 and compressed into the space between displacer 9 and movable wall 11. Lower compressor valve 24 and upper compressor valve 25 close. Upper port valve 36 and heater port valve 38 open.

FIG. 3 shows power piston 18 at about top dead center moving down. Air intake port 2 is covered, exhaust valve 6 is closed, lower compressor valve 24 is closed, and upper compressor valve 25 is closed. Upper port valve 36 is open. Heater port valve 38 is open. Displacer 9 is directly above power piston 18 and is moving down with power piston 18. Movable wall 11 is at the top of cylinder 12.

Figure 4:
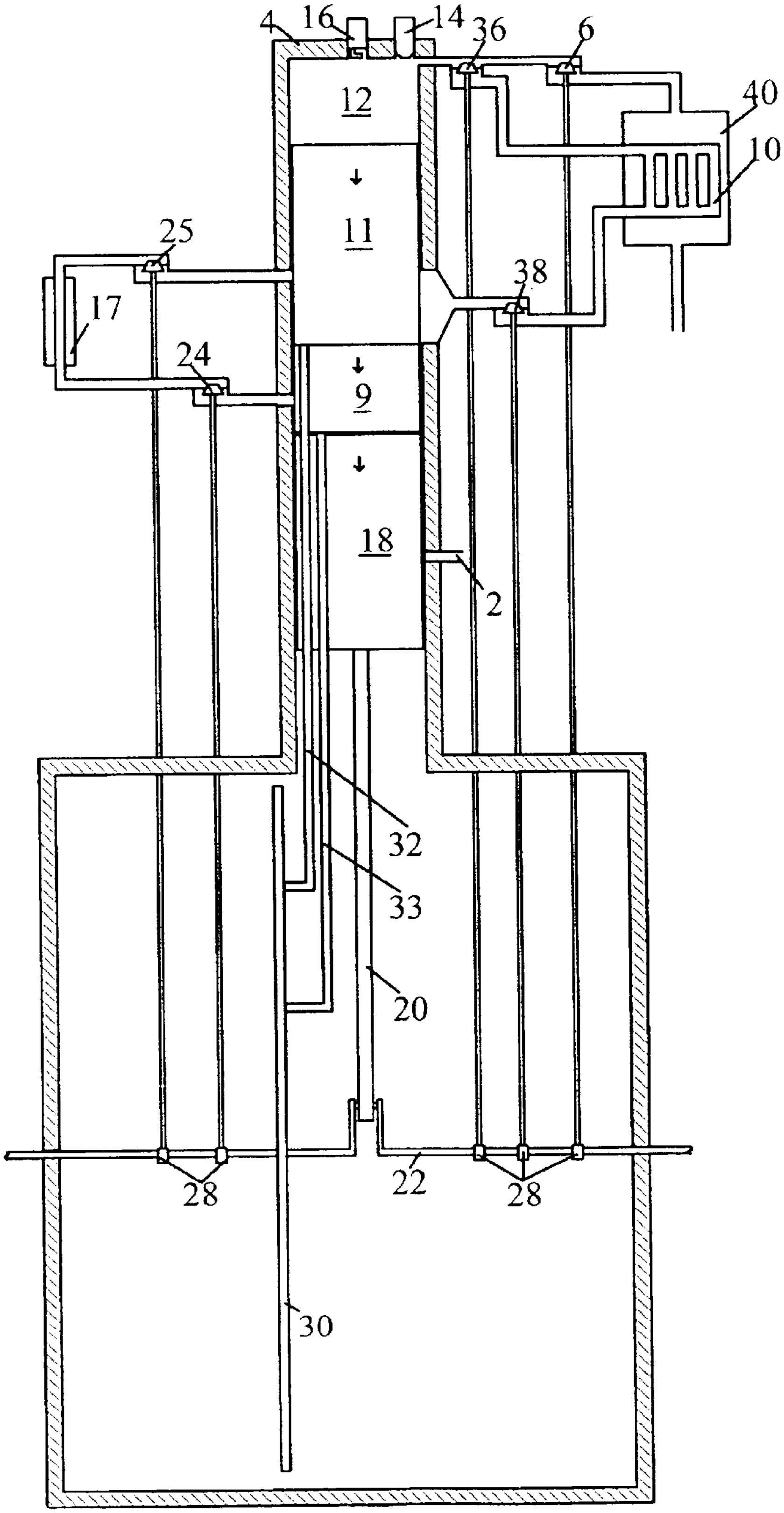
FIG. 4 shows the preferred embodiment of the engine at the end of the heat recovery part of the cycle, and at the start of the heated expansion part of the cycle.

Between FIG. 3 and FIG. 4 the heat recovery part of the cycle takes place. Power piston 18 moves down to about 15% of downward travel (45°). At the same time movable wall 11 moves down to the top of displacer 9. Compressed air is moved from the space between movable wall 11 and displacer 9 through heat exchanger high-pressure side 10, where it heats up, into the space between movable wall 11 and cylinder head 4. Upper port valve 36 and heater port valve 38 close.

In FIG. 4, power piston 18 is at about 15% of its downward travel (45°). Air intake port 2 is covered, exhaust valve 6 is closed, lower compressor valve 24 is closed, and upper compressor valve 25 is closed. Upper port valve 36 is closed. Heater port valve 38 is closed. Movable wall 11 is adjacent to displacer 9 which is adjacent to power piston 18, and all are being forced down by gas pressure forces.

Between FIG. 4 and FIG. 1 Fuel is injected and burned, and the heated expansion part of the cycle takes place. Burning fuel supplies heat to the expanding air. Power piston 18, displacer 9, and movable wall 11 move down together to about 85% of power piston's 18 downward travel (135°).

The cycle repeats.

Conclusion

The advantages of the Warren Cycle Internal Combustion Engine are:

It can be operated with the least amount of heat rejection at the lowest temperature possible for a hot air heat engine.

It can be operated with a large amount of heat added at a very high temperature.

The thickness of movable wall 11 can be such that the compression and the expansion volumes are separated. The heat from one does not effect the other.

All parts of the engine that are hot stay hot. All parts of the engine that are cold stay cold. There is no cycling of any parts of the engine between hot and cold.

The air compressed into cooler 17 stays compressed in cooler 17 and waits for the next cycle.

The compressed air in heat exchanger high-pressure side 10 stays compressed in heat exchanger high-pressure side 10 and waits for the next cycle.

As many compressor cooling systems as desired may be added to the engine. The more compressor cooling systems an engine has, the closer its compression equals the efficient constant temperature compression.

I claim:

1. A two stroke, internal combustion, reciprocating engine having a number of similar working units, each working unit comprising:

a) a cylinder, closed at one end by a cylinder head and containing a movable power piston which moves in a reciprocating manner and is connected to a power output shaft;

b) a movable wall located within said cylinder;

c) a means for moving said movable wall during predetermined times during the engine's operating cycle;

d) an air intake port;

e) an upper port valve;

f) a heater port valve;

g) a path from said heater port valve to said upper port valve containing a heat exchanger high pressure side;

h) an exhaust valve;

i) a path from said exhaust valve to the outside of said working unit containing a heat exchanger low pressure side;

j) a fuel injector;

k) an igniter.

2. An engine as recited in claim 1 wherein said means for moving said movable wall during predetermined times during the engine's operating cycle is a moveable wall cam follower and a cam driven from said power output shaft.

3. An engine as recited in claim 1 having one or more compressor cooling systems, said compressor cooling system comprising a displacer located within said cylinder, a lower compressor valve, an upper compressor valve, a path from said lower compressor valve to said upper compressor valve containing a cooler, and said displacer is moved by a displacer cam follower and a groove in said cam driven from said power output shaft.

4. An engine as recited in claim 1 wherein said movable wall is constructed so that the hot and cold parts of the engine are separate.

5. A process for operating the engine of claim 1 having the following steps:

a) from when said power piston uncovers said air intake port and moves through its bottom dead center position and moves back up to said air intake port; air intake occurs, said movable wall moving up until the desired charge is in said cylinder, at the same time some exhaust through said heat exchanger low pressure side also occurs;

b) after said power piston covers said air intake port, said power piston, and said movable wall continue to move up, pushing air out of said exhaust valve through said heat exchanger low pressure side until said movable wall reaches, the top of said cylinder, and said exhaust valve closes;

c) said power piston moves up, and compression occurs until said power piston reaches the top of its upward travel;

d) as said power piston starts moving down, said movable wall moves away from its position adjacent to said cylinder head toward said power piston, compressed air is forced from below said movable wall through said heat exchanger high pressure side, heats up, and moves to above said movable wall;

e) when said movable wall reaches the top of said power piston, fuel is injected and burned, and said movable wall, and said power piston continue the heated expansion stroke;

f) the cycle repeats.

6. A process for operating the engine of claim 3 having the following steps:

g) from when said power piston uncovers said air intake port and moves through its bottom dead center position and moves back up to said air intake port; air intake occurs, with displacer, and said movable wall moving up until the desired charge is in said cylinder, at the same time some exhaust through said heat exchanger low pressure side also occurs;

h) after said power piston covers said air intake port, said power piston, said displacer, and said movable wall continue to move up, pushing air out of said exhaust valve through said heat exchanger low pressure side until said movable wall reaches the top of said cylinder, and said exhaust valve closes;

i) said power piston moving up, and said displacer come together, pushing air through said cooler as compression occurs and said power piston reaches the top of its upward travel;

j) as said power piston starts moving down, said movable wall moves away from its position adjacent to said cylinder head toward said displacer, compressed air is forced from below said movable wall through said heat exchanger high pressure side, heats up, and moves to above said movable wall;

k) when said movable wall reaches the top of said displacer, fuel is injected and burned, and said movable wall, said displacer, and said power piston continue the heated expansion stroke;

1) the cycle repeats.

* * * * *